(12) United States Patent
Cloft et al.

(10) Patent No.: US 8,092,169 B2
(45) Date of Patent: Jan. 10, 2012

(54) INTEGRATED INLET FAN CASE

(75) Inventors: Thomas G. Cloft, Glastonbury, CT (US); Ron I. Prihar, West Hartford, CT (US); Darin S. Lussier, Berlin, CT (US)

(73) Assignee: United Technologies Corporation, Hartford, CT (US)

( * ) Notice: Subject to any disclaimer, the term of this patent is extended or adjusted under 35 U.S.C. 154(b) by 719 days.

(21) Appl. No.: 12/211,127

(22) Filed: Sep. 16, 2008

(65) Prior Publication Data

US 2010/0068051 A1 Mar. 18, 2010

(51) Int. Cl.
*F01D 1/00* (2006.01)

(52) U.S. Cl. ...................... 415/220; 415/182.1

(58) Field of Classification Search ............ 415/220
See application file for complete search history.

(56) References Cited

U.S. PATENT DOCUMENTS

| | | | |
|---|---|---|---|
| 4,155,221 A | 5/1979 | Dhoore et al. | |
| 4,417,848 A | 11/1983 | Dembeck | |
| 4,452,563 A | 6/1984 | Belanger | |
| 5,000,399 A * | 3/1991 | Readnour et al. | 244/53 B |
| 5,409,349 A | 4/1995 | Kulak | |
| 5,482,429 A | 1/1996 | Penda | |
| 5,524,847 A | 6/1996 | Brodell | |
| 6,059,524 A | 5/2000 | Costa | |
| 6,340,135 B1 | 1/2002 | Barton | |
| 6,857,669 B2 | 2/2005 | Porte | |
| 6,896,099 B2 | 5/2005 | Porte | |
| 6,920,958 B2 | 7/2005 | Harrison | |
| 7,090,165 B2 * | 8/2006 | Jones et al. | 244/53 R |
| 7,588,212 B2 * | 9/2009 | Moe et al. | 244/134 D |
| 2005/0006529 A1 * | 1/2005 | Moe et al. | 244/134 D |
| 2006/0145001 A1 | 7/2006 | Smith | |
| 2007/0246603 A1 * | 10/2007 | Udall et al. | 244/54 |
| 2008/0185215 A2 * | 8/2008 | Strunk | 181/214 |
| 2009/0293497 A1 * | 12/2009 | Cloft | 60/796 |

FOREIGN PATENT DOCUMENTS

| | | |
|---|---|---|
| EP | 0540193 | 5/1993 |
| EP | 0837247 | 4/1998 |
| EP | 1582702 | 10/2005 |
| EP | 2014550 | 1/2009 |
| EP | 2128402 | 12/2009 |
| FR | 2855497 | 12/2004 |
| GB | 2259287 | 3/1993 |
| GB | 2434837 | 8/2007 |
| WO | 2008006961 | 1/2008 |

OTHER PUBLICATIONS

European Search Report dated Feb. 1, 2010.

* cited by examiner

*Primary Examiner* — Nitin Parekh

(74) *Attorney, Agent, or Firm* — Carlson, Gaskey & Olds, PC

(57) ABSTRACT

A fan section of a gas turbine engine includes nacelle inlet and a fan containment case that are integrally formed together as a single-piece component.

24 Claims, 4 Drawing Sheets

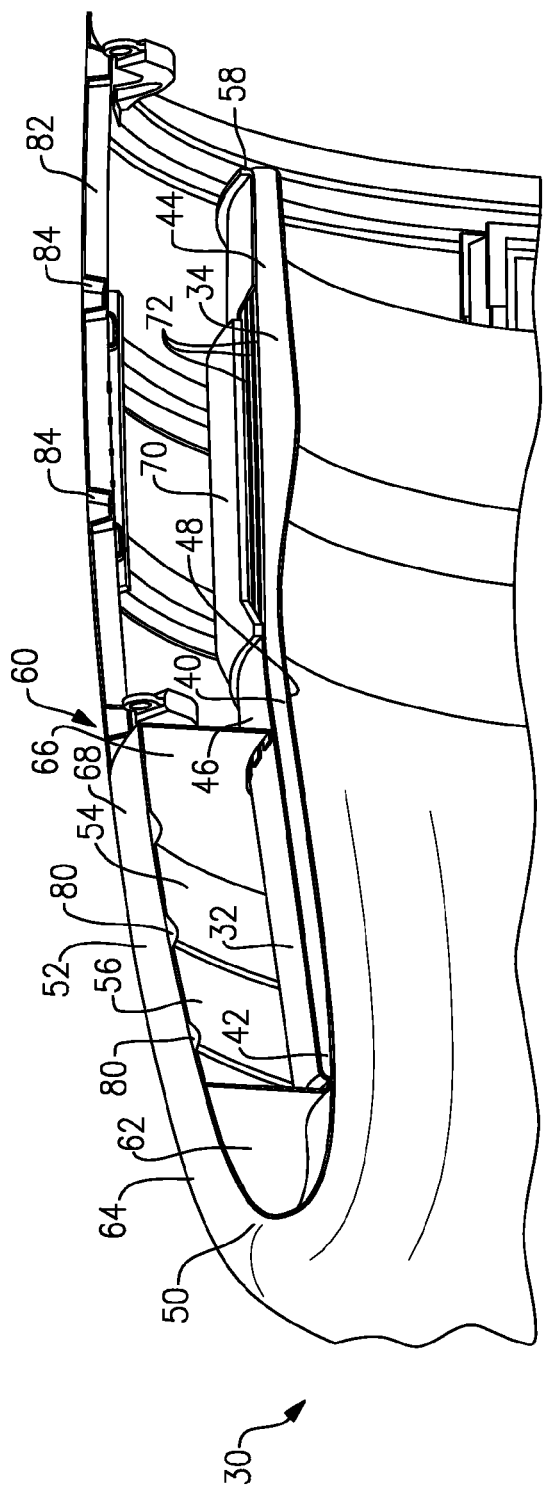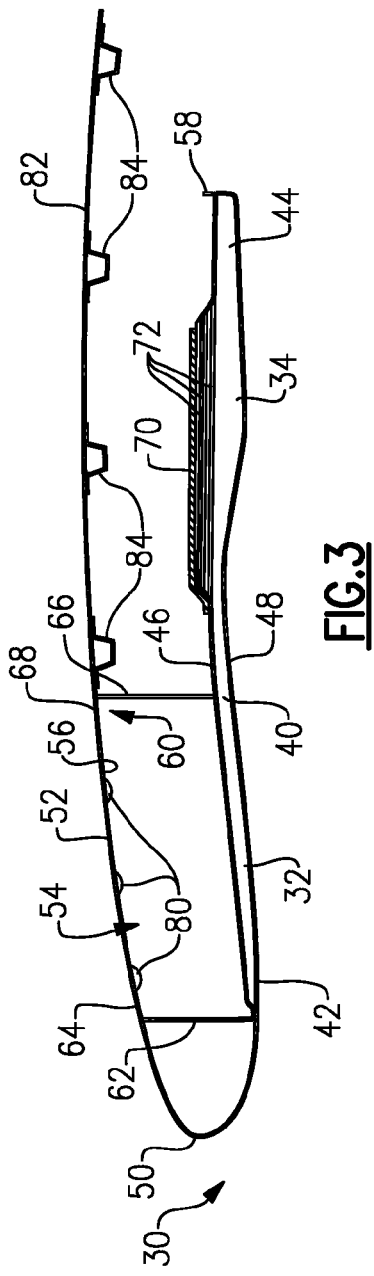

INTEGRATED INLET FAN CASE

BACKGROUND OF THE INVENTION

This disclosure relates to a fan case for a gas turbine engine and relates more specifically to an integrated inlet for the fan case that provides significant weight reduction.

A gas turbine engine includes fan, compressor, combustor, and turbine sections that are each comprised of various components. An inlet assembly for the fan section includes a nacelle inlet with fore and aft bulkheads and a stiffened outer inlet barrel. A fan containment case includes a first flange at a fore end that is attached to the nacelle inlet and a second flange at an aft end that is attached to the engine fan case. Cowl doors are positioned radially outwardly of the fan containment case and include a hinge section such that the cowl door is movable relative to the stiffened outer inlet barrel.

Each of the various attachment interfaces between the various components adds weight and cost to the gas turbine engine. Accordingly, there is a need to reduce weight and cost without adversely affecting structural requirements.

SUMMARY OF THE INVENTION

A fan section of a gas turbine engine includes a nacelle inlet and a fan containment case that are integrally formed together as a single-piece structure.

In one example, the single-piece structure includes a fore end portion that forms the nacelle inlet and an aft end portion that forms the fan containment case. The single-piece structure has a radially outer circumferential surface and a radially inner circumferential surface at the nacelle inlet and fan containment case. The radially outer and radially inner circumferential surfaces provide continuous uninterrupted surfaces from the fore end portion to the aft end portion.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

FIG. 2 is a perspective cross-sectional view of one example of an integrated inlet.

FIG. 3 is a cross-section of the integrated inlet of FIG. 2.

DETAILED DESCRIPTION OF THE PREFERRED EMBODIMENT

Figure 1:
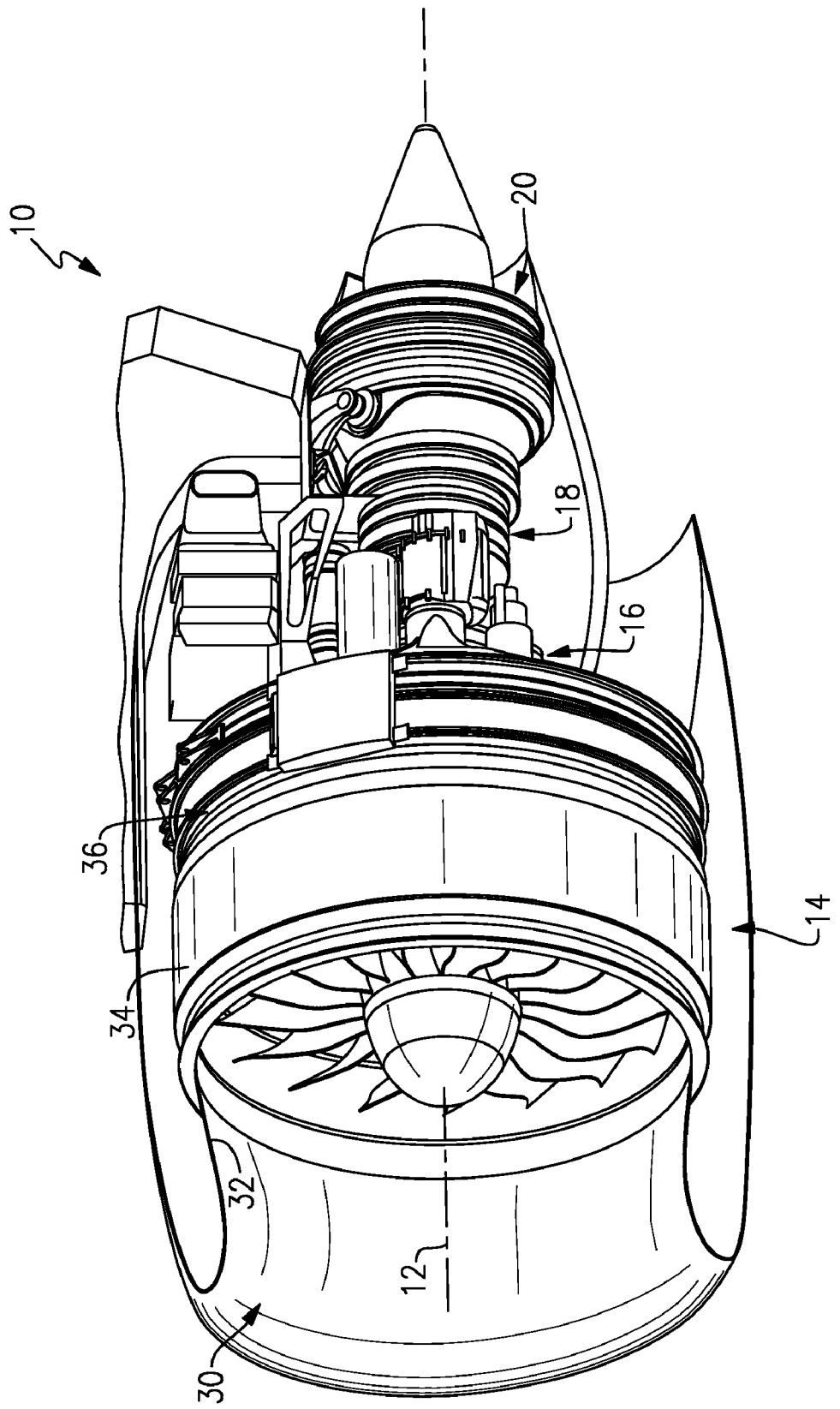
FIG. 1 is a perspective view, shown in partial cross-section, of a gas turbine engine with an integrated inlet.

FIG. 1 illustrates selected portions of an example turbine engine 10, such as a gas turbine engine 10 used for propulsion. In this example, the gas turbine engine 10 is circumferentially disposed about an engine centerline 12. The gas turbine engine 10 includes a fan section 14, a compressor section 16 aft of the fan section 14, a combustion section 18 aft of the compressor section 16, and a turbine section 20 aft of the combustion section 18. The compressor section 16 and the turbine section 20 can utilize any of various types of compressors and turbines and can include high and low pressure sections. As is known, air compressed in the compressor section 16 is mixed with fuel and burned in the combustion section 18 to produce hot gasses that are expanded in the turbine section 20.

FIG. 1 includes an integrated inlet 30 having a single-piece component that forms both a nacelle inlet 32 and a fan containment case 34. FIGS. 2-5 show various different examples of integrated inlets. Each integrated inlet terminates at an aft end at an engine case flange connector. This connector attaches to the engine casing 36 as shown generally in FIG. 1. FIG. 1 is a schematic presentation for illustrative purposes only and is not a limitation on the disclosed examples. Additionally, there are various types of gas turbine engines, many of which could benefit from the examples disclosed herein and are not limited to the designs shown.

Further, it should be understood that while only the upper cross-section of a portion of the turbine engine 10 relative to the centerline 12 is shown in the FIGS. 2-5, the lower cross-section is similarly configured to that of the upper cross-section as identified components surround the centerline 12.

One example of an integrated inlet 30 is shown in FIGS. 2-3. The integrated inlet 30 is an integrally formed, single-piece component or structure 40 that includes a fore end portion 42 that forms the nacelle inlet 32 and an aft end portion 44 that forms the fan containment case 34. The single-piece structure 40 has a radially outer circumferential surface 46 and a radially inner circumferential surface 48 (relative to the engine centerline 12). The radially outer 46 and the radially inner 48 circumferential surfaces provide continuous uninterrupted surfaces from the fore end portion 42 to the aft end portion 44. As shown, the thickness between the radially outer 46 and the radially inner 48 circumferential surfaces can vary as needed depending upon a specific application and/or to meet desired strength requirements.

Formation of the nacelle inlet 32 and the fan containment case 34 as an integrated single piece structure provides significant weight savings and cost reductions. The traditional attachment joint between the nacelle inlet and the fan containment case is eliminated, which in turn eliminates the need for hundreds of bolts, washers and nuts used at this traditional interface.

As shown in FIGS. 2 and 3, the fore end portion 42 includes a lip portion 50 that transitions into an outer barrel portion 52 that is spaced radially outwardly relative to the nacelle inlet 32. A gap 54 is formed between the radially outer circumferential surface 46 of the single-piece piece structure 40 at the nacelle inlet 32 and a radially inner circumferential surface 56 of the outer barrel portion 52. The aft end portion 44 of the single-piece structure 40 includes an engine case flange connector 58.

Thus, in the example of FIGS. 2-3, the single-piece structure 40 extends from the engine case flange connector 58 at the aft end portion 44, along the fan containment case 34, along the nacelle inlet 32, transitions into the lip portion 50, and then extends into the outer barrel portion 52. The outer barrel portion 52 terminates at a cowl door connection interface shown generally at 60.

In this example, a fore bulkhead 62 is positioned adjacent a fore end 64 of the outer barrel portion 52 and an aft bulkhead 66 is positioned adjacent an aft end 68 of the outer barrel portion 52. A Kevlar® belt 70 and banded cloth layers 72 are bonded to the fan containment case 34 aft of the aft bulkhead 66 in this example. The belt 70 and cloth layers 72 are used to support a fan blade rub strip. The belt 70 and cloth layers 72 provide a stiffened containment zone and represent a location of the fan case that is designed to withstand a blade out event. It should be understood that this area could be metal, metal and belt layers, composite, composite and belt layers, etc. In the example shown a belt is used; however, any combination of the previously mentioned materials could also be used.

Also shown in the example of FIGS. 2-3 are a plurality of stiffeners 80 in the outer barrel portion 52. The stiffeners 80 are formed as grooves or depressions in the outer barrel portion 52. Cowl doors 82, aft of the outer barrel portion 52, also can include stiffeners 84 if necessary.

Figure 4:
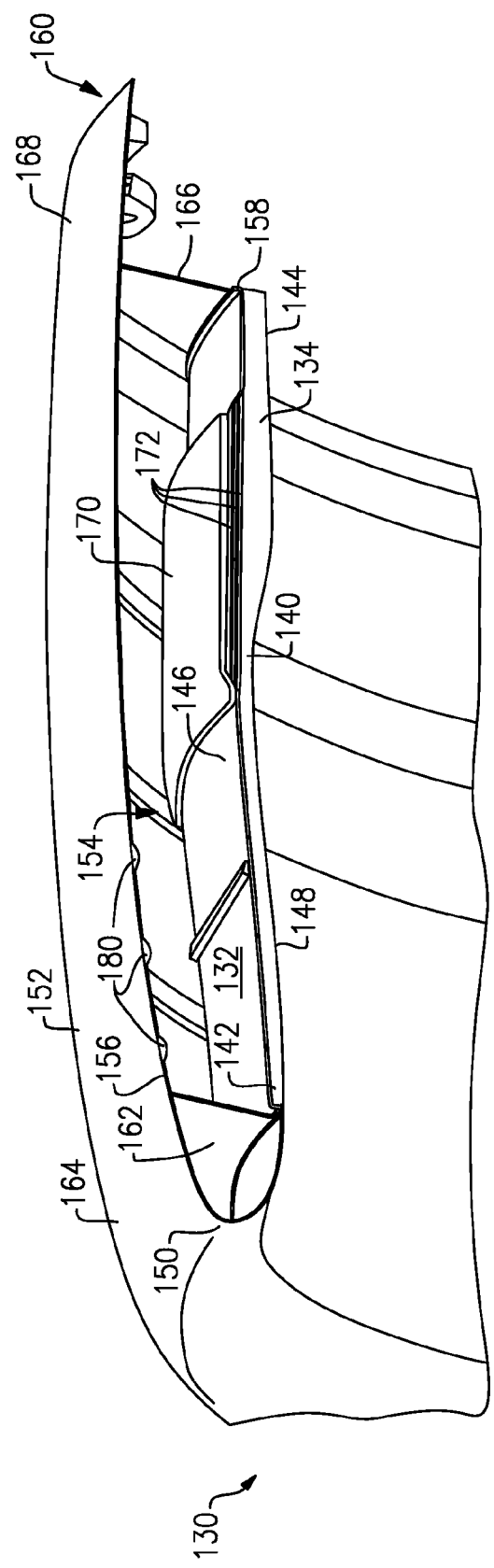
FIG. 4 is a perspective cross-sectional view of another example of an integrated inlet.

FIG. 4 shows an example that is similar to FIGS. 2-3 but the outer barrel is extended in the aft direction to extend back beyond the engine case flange connection. Thus, traditional cowl doors are shortened, and are eliminated over the fan containment area.

As shown in FIG. 4, an integrated inlet 130 is an integrally formed, single-piece component or structure 140 that includes a fore end portion 142 that forms the nacelle inlet 132 and an aft end portion 144 that forms the fan containment case 134. The single-piece structure 140 has a radially outer circumferential surface 146 and a radially inner circumferential surface 148 (relative to the engine centerline 12). The radially outer 146 and the radially inner 148 circumferential surfaces provide continuous uninterrupted surfaces from the fore end portion 142 to the aft end portion 144. As shown, the thickness between the radially outer 146 and the radially inner 148 circumferential surfaces can vary as needed. Further, an inlet acoustic treatment is contained within the nacelle inlet 132 at the radially inner circumferential surface 148 of the fore end portion 142.

The fore end portion 142 includes a lip portion 150 that transitions into an outer barrel portion 152 that is spaced radially outwardly relative to the nacelle inlet 132. A gap 154 is formed between the radially outer circumferential surface 146 of the single-piece piece structure 140 at the nacelle inlet 132 and a radially inner circumferential surface 156 of the outer barrel portion 152. The aft end portion 144 of the single-piece structure 140 includes an engine case flange connector 158.

In this example the single-piece structure 140 extends from the engine case flange connector 158 at the aft end portion 144, along the fan containment case 134, along the nacelle inlet 132, transitions into the lip portion 150, and then extends into the outer barrel portion 152. The outer barrel portion 52 terminates at a position that is aft of the engine case flange connection 158 as indicated generally at 160. Thus, the outer barrel portion 152 overlaps the entire nacelle inlet 132 and the fan containment case 134.

In this example, a fore bulkhead 162 is positioned adjacent a fore end 164 of the outer barrel portion 152 and an aft bulkhead 166 is positioned adjacent an aft end 168 of the outer barrel portion 52 at the engine case flange connection 158. No other bulkheads are positioned with the gap 154 between the bulkheads 162, 166. A Kevlar® belt 170 and banded cloth layers 172 are bonded to the fan containment case 134 at a position aft of the fore bulkhead 162 and fore of the aft bulkhead 166 in this example.

Also shown in this example are a plurality of stiffeners 180 in the outer barrel portion 52. The stiffeners 80 are formed as grooves or depressions in the outer barrel portion 52 as shown.

Figure 5:
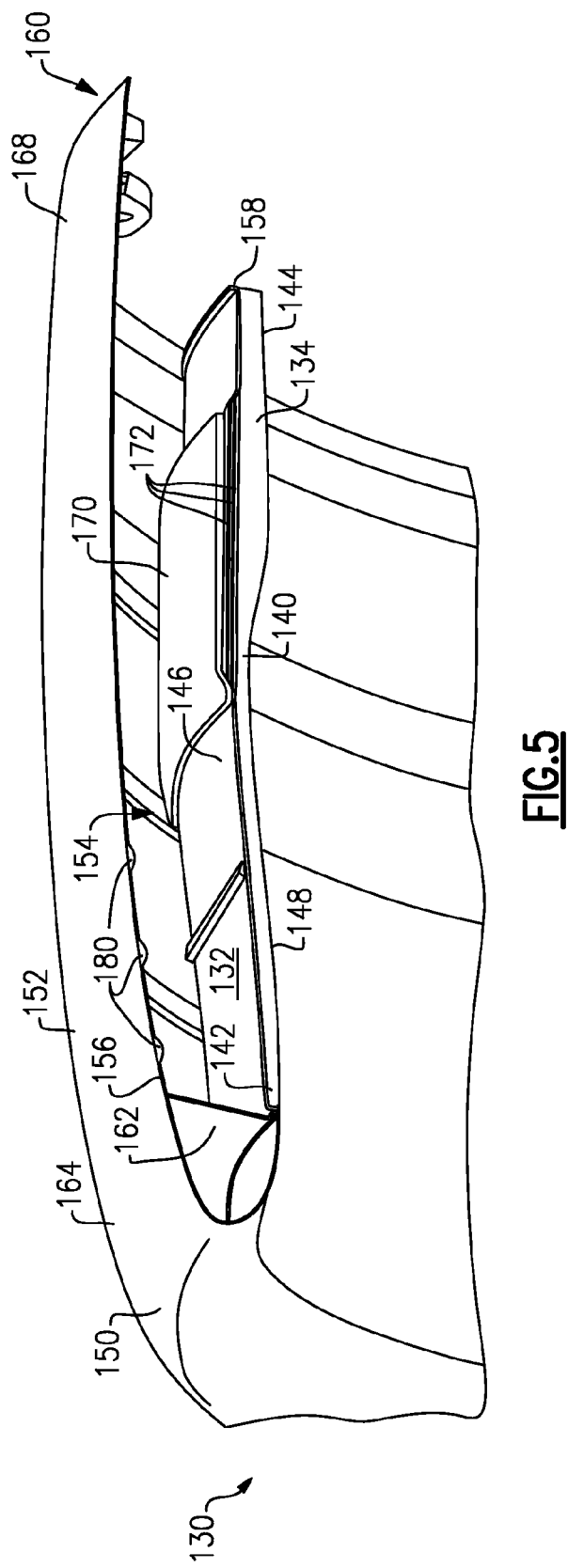
FIG. 5 is a perspective cross-sectional view of another example of an integrated inlet.

FIG. 5 is similar to FIG. 4; however, the aft bulkhead 166 is removed. Other stiffeners may be required depending upon the size of other associated components and the engine application.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A fan section for a gas turbine engine comprising:
a fan containment case formed as a single-piece structure with a nacelle inlet wherein said single-piece structure includes a fore end portion that forms said nacelle inlet and an aft end portion that forms said fan containment case, and wherein said aft end portion includes an engine case flange connector; and
at least one bulkhead positioned at said fore end portion.

2. The fan section according to claim 1 wherein said single-piece structure has a radially outer circumferential surface and a radially inner circumferential surface and wherein said radially outer and said radially inner circumferential surfaces provide a continuous uninterrupted surface from said fore end portion to said aft end portion.

3. The fan section according to claim 2 wherein said fore end portion includes a lip portion that transitions into an outer barrel portion that is spaced radially outwardly relative to said nacelle inlet.

4. The fan section according to claim 3 wherein said at least one bulkhead comprises a fore bulkhead and an aft bulkhead wherein said fore bulkhead is positioned adjacent a fore end of said outer barrel portion and said aft bulkhead to be positioned adjacent an aft end of said outer barrel portion.

5. The fan section according to claim 3 wherein said outer barrel portion extends from said lip portion to overlap said aft end portion of said single-piece structure.

6. The fan section according to claim 5 wherein said at least one bulkhead comprises a fore bulkhead and an aft bulkhead wherein said fore bulkhead is positioned adjacent a fore end of said outer barrel portion and said aft bulkhead is to be positioned adjacent an aft end of said outer barrel portion at an engine case attachment interface.

7. The fan section according to claim 5 wherein said at least one bulkhead comprises only a single bulkhead positioned adjacent a fore end of said outer barrel portion.

8. The fan section according to claim 1 wherein said single-piece structure includes at least one stiffener.

9. The fan section according to claim 8 wherein said single-piece structure has a radially outer circumferential portion and a radially inner circumferential portion, and wherein said at least one stiffener is formed within said radially outer circumferential portion.

10. The fan section according to claim 8 wherein said at least one stiffener comprises a plurality of stiffeners.

11. The fan section according to claim 1 wherein said single-piece structure extends from the engine case flange connector at the aft end portion, along the fan containment case, along the nacelle inlet, and then transitions into a lip portion which extends into a radially outer barrel portion that terminates at a cowl door connection interface.

12. The fan section according to claim 11 wherein said at least one bulkhead comprises a first bulkhead positioned at a fore end of said nacelle inlet and a second bulkhead positioned adjacent to the cowl door connection interface.

13. The fan section according to claim 11 wherein the engine case flange connector is aft of the cowl door connection interface.

14. The fan section according to claim 11 wherein the cowl door connection interface is aft of the engine case flange connector.

15. A gas turbine engine comprising:
   a compressor section;
   a combustor section;
   a turbine section; and
   a fan section having a fan containment case formed as a single-piece structure with a nacelle inlet wherein said single-piece structure includes a fore end portion that forms said nacelle inlet and an aft end portion that forms said fan containment case, and wherein said aft end portion includes an engine case flange connector, and including at least one bulkhead positioned at said fore end portion.

16. The gas turbine engine according to claim 15 wherein said single-piece structure has a radially outer circumferential surface and a radially inner circumferential surface with said radially outer and said radially inner circumferential surfaces providing continuous uninterrupted surfaces from said fore end portion to said aft end portion.

17. The gas turbine engine according to claim 16 wherein said single-piece structure extends from said fore end portion to form a lip portion that transitions into an outer barrel portion that is spaced radially outwardly relative to the radially outer circumferential surface at said nacelle inlet.

18. The gas turbine engine according to claim 17 wherein said outer barrel portion overlaps only a portion of said nacelle inlet and terminates at a cowl door connection interface.

19. The gas turbine engine according to claim 17 wherein said outer barrel portion overlaps said nacelle inlet and said fan containment case.

20. The gas turbine engine according to claim 15 wherein said single-piece structure has a radially outer circumferential portion and a radially inner circumferential portion, and including at least one stiffener formed within said radially outer circumferential portion.

21. The gas turbine engine according to claim 15 wherein said single-piece structure extends from the engine case flange connector at the aft end portion, along the fan containment case, along the nacelle inlet, and then transitions into a lip portion which extends into a radially outer barrel portion that terminates at a cowl door connection interface.

22. The gas turbine engine according to claim 21 wherein said at least one bulkhead comprises a first bulkhead positioned at a fore end of said nacelle inlet and a second bulkhead positioned adjacent to the cowl door connection interface.

23. The gas turbine engine according to claim 21 wherein the engine case flange connector is aft of the cowl door connection interface.

24. The gas turbine engine according to claim 21 wherein the cowl door connection interface is aft of the engine case flange connector.

* * * * *